Oct. 5, 1971    G. M. MIERLEY, SR., ET AL    3,609,968
SELF-ADJUSTING SEAL STRUCTURE

Filed April 29, 1970    3 Sheets-Sheet 2

WITNESSES
Bruce L. Samlan
Alfred G. Colaizzi

INVENTOR
George M. Mierley, Sr.
Thomas J. Rahaim

United States Patent Office 3,609,968
Patented Oct. 5, 1971

3,609,968
SELF-ADJUSTING SEAL STRUCTURE
George M. Mierley, Sr., Wilmington, and Thomas J. Rahaim, Claymont, Del., assignors to Westinghouse Electric Corporation, Pittsburgh, Pa.
Filed Apr. 29, 1970, Ser. No. 32,926
Int. Cl. F02c 7/20, 7/28; F01d 9/04
U.S. Cl. 60—39.32
12 Claims

ABSTRACT OF THE DISCLOSURE

A self-adjusting seal structure to prevent leakage of high-pressure compressor air between the transition portions of annularly spaced combustion chambers to the first stage of a gas turbine. The combustion chambers are cylindrical in cross-section and the transition members are arcuate in cross section at their outlets. The outlets are in closely spaced annular relation and jointly define a substantially continuous annular outlet for the hot combustion gases for motivating the turbine. The sealing structures are disposed between each pair of adjacent transition members and are provided with a pair of V-shaped members, axially aligned, and oppositely spring biased into wedging sealing relation with the support structures extending from the transition members, to thereby seal the spaces between the adjacent transition members.

BACKGROUND OF THE INVENTION

This invention relates, generally, to a self-adjusting seal structure in a turbine and more particularly to a seal structure for minimizing leakage of high pressure compressor air to the first stage of a gas turbine. As gas turbines are required to operate at increased temperatures and pressures necessary for increased performance, there is a greater demand to prevent cooler compressor air from mixing with the hot motive fluid which is directed to the first stage of the turbine. The high pressure compressor air entering the first stage would have a different speed and direction than the motive fluid and upon impact would cause vibrations in the blades. Consequently, it is desirable to design a system to more effectively minimize the leakage of the higher pressure, cooler air to the first stage of the turbine.

In the prior art, it is common to provide large sealing partitions with leaf spring arrangements to prevent this type of leakage, however, because of the large temperature range over these partitions, joints commonly open permitting the leakage of the high pressure air to the first stage.

SUMMARY

Generally, the present invention relates to a self-adjusting seal structure in a gas turbine which prevents the leakage of high pressure compressor air between the combustion chamber outlets into the first stage of the gas turbine.

As newer materials are used which permit operation at higher temperatures of the hot motive gases, it becomes more imperative to prevent the leakage of cooler air to these turbine blades to prevent blade vibration.

An outer casing structure encloses and defines a plenum chamber in the turbine, which is pressurized by air from the compressor. A plurality of combustion chambers are equally spaced in an annular array within the plenum chamber. Each combustion chamber has a cylindrical portion at the upstream end and a transition member at the downstream end to change the shape of the chamber from circular cross-section to a narrow arcuate cross-section at the outlet. The outlets jointly form an annular outlet to direct hot motive gases to the first stage. The transition members are in spaced relation forming an annular array and thereby defining a plurality of radially extending spaces. A flange encompasses each transition member at its outlet portion, hereinafter defined as a picture-frame flange. The periphery of the picture-frame flange is similar in shape to the transition member at the outlet portion. The adjacent flanges are annularly spaced relative to each other, the radially extending adjacent sides thereby defining a plurality of first radial spaces. An arcuate retaining segment is secured, at the radially outer side of each transition member, to the picture-frame flange and the inner casing structure to prevent leakage of the compressor air along the radially outer arcuate surface of each transition member to the first stage. A pair of stop plates are secured between each adjacent members, the stop plates being in mutually annular spaced relation, and thereby defining a plurality of second radial spaces. Two V-shaped members are radially inserted into the first and second spaces and are oppositely spring biased between the stop plates and the flanges into wedging sealing relation. On the radially inner side of the transition members, a segmented spring-biased structure prevents fluid communication between the plenum chamber and the first stage.

The self-adjusting sealing structure allows for the expansion and contraction of the combustion chambers at the transition portions and automatically adjusts to compensate for the smaller or larger radial spaces, respectively, and thus minimizes leakage of compressor air to the first stage.

DESCRIPTION OF THE PREFERRED EMBODIMENT

Figure 1:
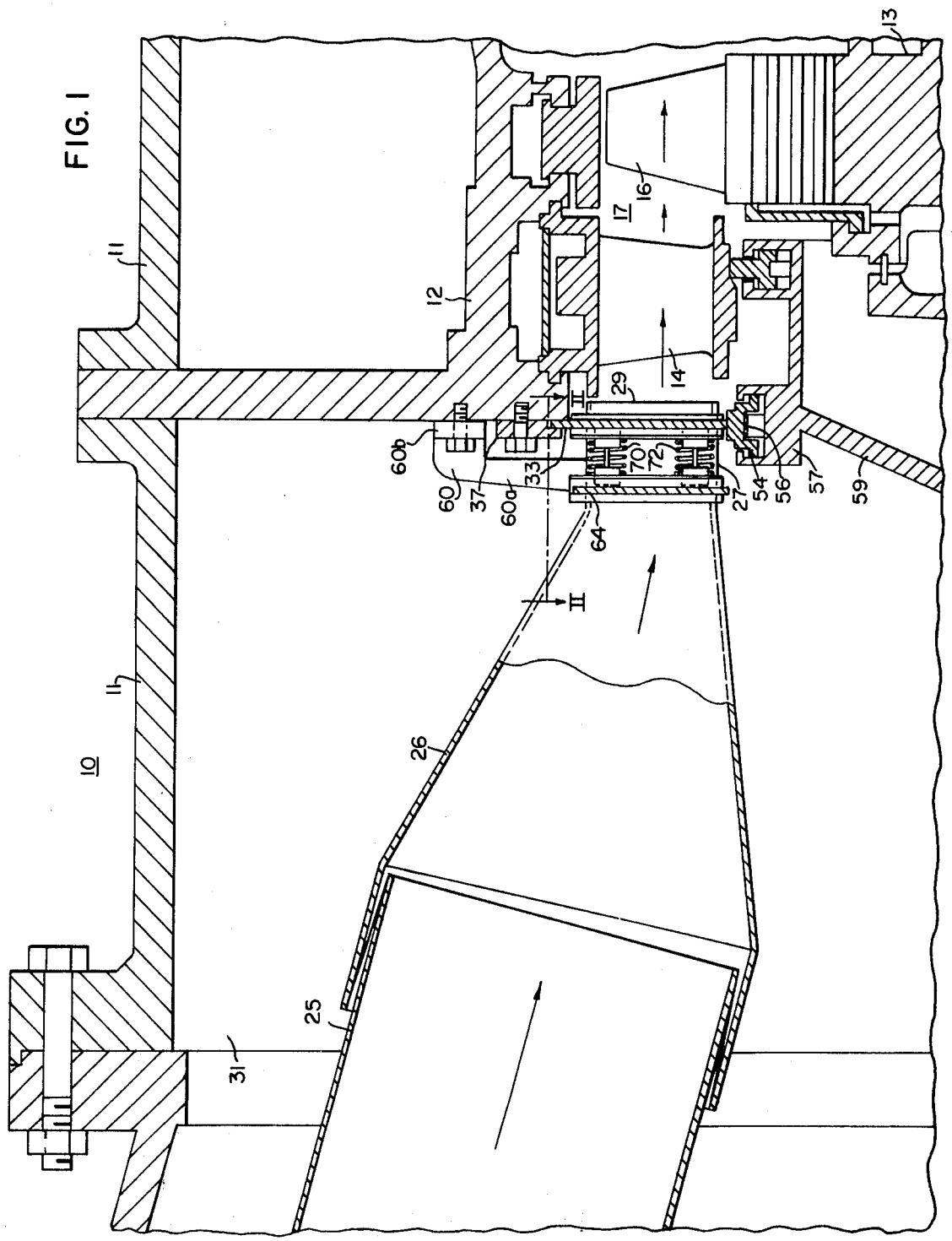
FIG. 1 is a view showing a partial longitudinal section of an axial flow gas turbine having a seal structure formed in accordance with the principles of this invention.

Referring to the drawings in detail and particularly to FIG. 1, there is shown a portion of an axial flow gas turbine 10. The turbine 10 comprises an outer casing 11 of generally tubular shape, an inner casing 12 of tubular shape encompassed by the outer casing 11 and a rotor structure 13 rotatably supported within the inner casing 12 in any suitable manner (not shown). At least one annular row of rotating blades 16 (only one row being shown) extend radially outward from the rotor 13. Cooperatively associated with the rotating blades 16 to form stages for motive fluid expansion is at least one annular row of stationary blades 14 (only one row being shown) which are supported within the inner casing 12. The first stationary row of blades 14 and the first rotating row 16 is defined as the first stage 17.

Figure 2:
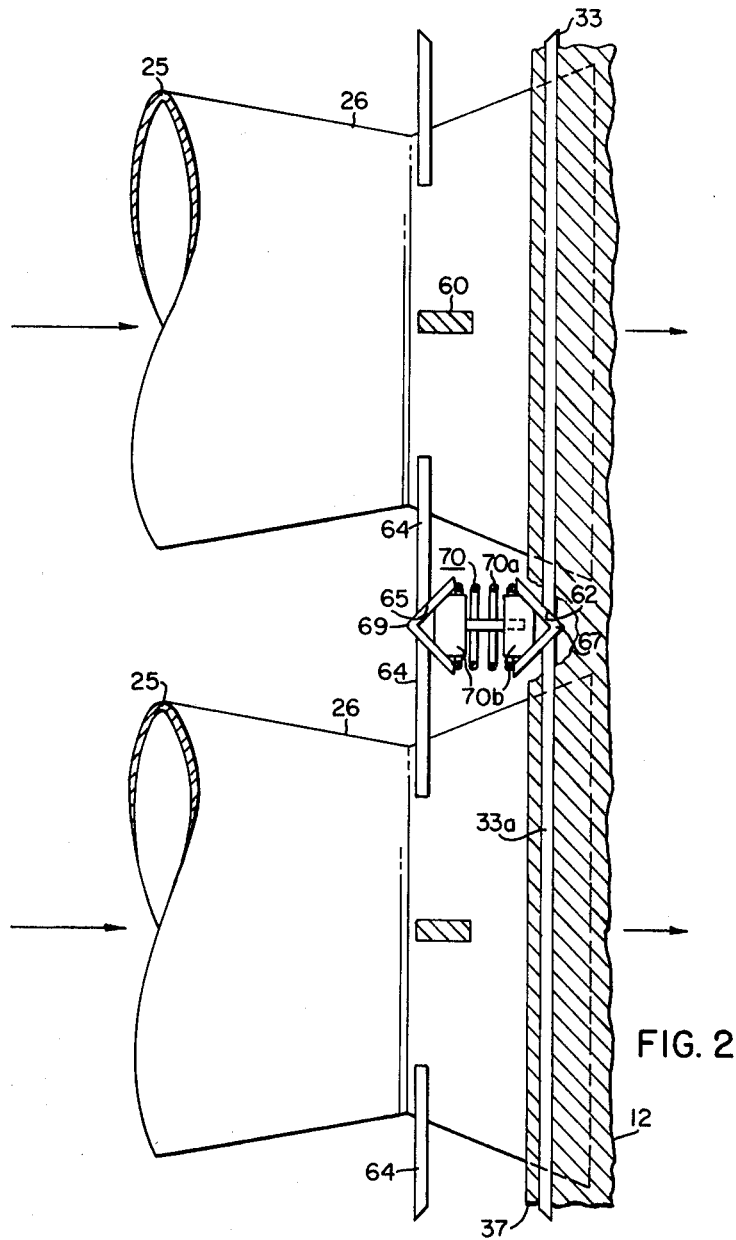
FIG. 2 is an enlarged developed plan view taken along line II—II in FIG. 1.
Figure 3:
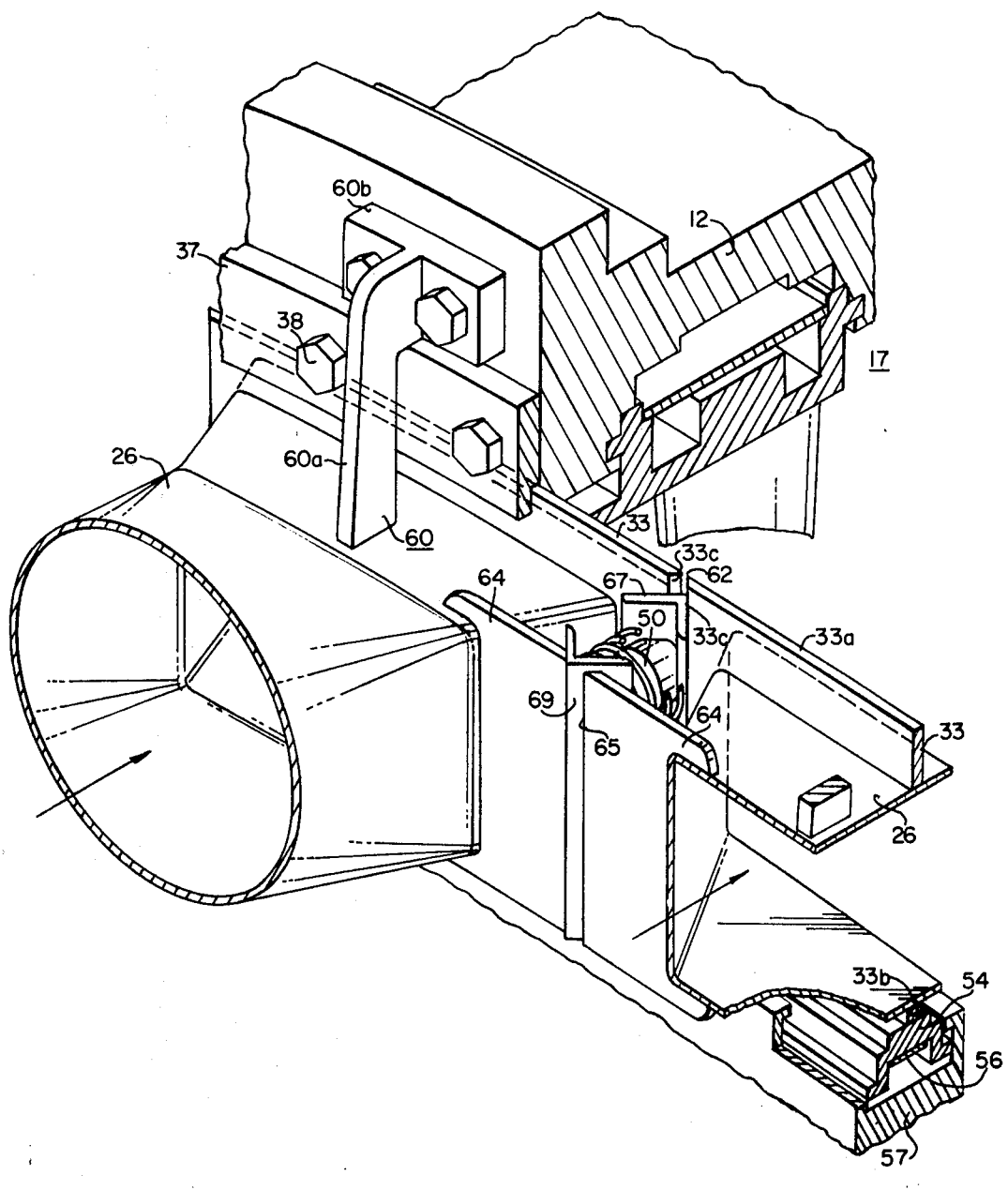
FIG. 3 is an enlarged isometric view of the sealing structure shown in FIG. 1.

Hot motive fluid, such as pressurized combustion gas is generated in a plurality of circumferentially disposed combustion chambers 25 (FIGS. 1 and 2). The chambers 25 are of the well known cannister type having cylindrical portions at the upstream ends and corresponding transition members 26 at the downstream ends 27 to change the cross-sectional shape of the chambers from circular to arcuate at the outlets 29 (FIG. 3). The outlets 29 are in a closely spaced annular relation and jointly form an annular outlet to direct the hot motive gases to the first stage 17 in a full and continuous peripheral stream. The gases flow past the stationary blades 14 and the rotary blades 16 as shown by the arrows from left to right with resulting expansion of the gases to rotate the rotor structure 13 about its longitudinal axis.

As seen in FIG. 1, the combustion chambers 25 are disposed in a space partially defined by outer casing 11, the space being called a plenum chamber 31 which is pressurized by air from a compressor (not shown) The pressurized air is directed into the combustion chambers 25 to mix with the fuel to form a combustible mixture which is burned to provide the hot motive gases. At the downstream ends 27 of the transition portions 26 are a plurality of picture-frame flanges 33 (FIG. 3). The flanges 33 encompass the transition members 26 and are rigidly secured to the transition members by any suitable means, such as by welding. Each flange 33 has a radially outer arcuate portion 33a, a radially inner arcuate portion 33b, and two radially extending side portions 33c. The radially outer portion 33a of each picture-frame flange 33 and the radially inner portion 33b conform to the arcuate shape of each transition portion 26. Together, the radially outer portions 33a form a segmented outer ring and the radially inward flanges 33b form a segmented inner ring.

As best seen in FIGS. 2 and 3, arcuate retaining segments 37 fit over the upstream side of the radially outer portions 33a of the flanges 33. On the downstream side of the radially outer flanges 33a is the inner casing 12. The retaining segments 37 and the inner casing 12 are secured by fastening means, such as bolts 38 (FIGS. 1 and 3). The retaining segments 37, the radially outer portion 33a of the flanges 33 and the inner casing 12 provide a sealing arrangement to prohibit the high pressure compressor air in the plenum chamber 31 from entering the first stage 17 of the turbine along the readily outer sides of the transition portions 26 of the combustion chambers 25.

To seal the radially inner side of the transition members 26 from the first stage of the turbine, a segmented seal 54 (FIGS. 1 and 3) is secured to the radially inward flanges 33b, which is biased by a spring 56 in a seal housing structure 57. The housing structure 57 may be a part of a tubular member 59 which defines the inner wall of the plenum chamber 31 and seals the plenum chamber 31 and the first stage 17 on the radially inner side of the transition members 26, as well known in the art.

A plurality of support brackets 60 are provided to further secure and support the transition portions 26 of the combustion chambers 25 to the inner casing 12, one bracket corresponding to each transition portion. Each bracket 60 has a radially extending portion 60a and an annular mounting flange portion 60b (FIGS. 1 and 3). The radial portion 60a is secured to the transition member 26 and the mounting portion 60b is secured to the inner casing 12 at a point radially outward relative to the retaining ring 37.

Referring to FIG. 1, it can be seen that the retaining segments 37 and the inner casing 12 are in spaced relation in a radial direction relative to the combustion chambers 25 to allow for expansion of the chambers. As previously described, the combustion chambers 25 and their transition members 26 are in a closely spaced annular relation (FIGS. 2 and 3) to allow for expansion of the chambers 25 and the transition members 26. The radially extending sides 33c of the picture-frame flanges 33 encompassing the transition members 26 are also annularly spaced relative to each other. The adjacent sides 33c define a plurality of first radially extending spaces 62.

It is necessary to provide a sealing structure to prevent high pressure compressor air from leaking through these radial spaces 62, but provision must also be made to allow for the expansion between the transition members 26 and, correspondingly, the flanges 33.

Upstream of the flanges 33 and secured to the transition members 26 of the combustion chambers 25 are pairs of stop plates 64, one welded to each side of each combustion chamber. The adjacent plates 64 are in mutually annular spaced relation (FIGS. 2 and 3). Each stop plate 64 is one continuous piece extending from the radially outer side of the transition member to the radially inner side as shown in FIGS. 1 and 3. The annular spaced relation between the adjacent stop plates 64 defines a plurality of second radially extending spaces 65 (FIGS. 2 and 3). The first and second radial spaces 62 and 65 are aligned axially with each other.

There is one sealing structure disposed between each pair of adjacent transition members but since all of the structures are similarly constructed, only one will be described.

A first angle member 67, V-shaped in cross-section, is inserted into the first radial space 62 and a second similar angle member 69 is inserted into the second radial space 65, the apexes of the angle members being in opposite directions. Between the first and second angle members 67 and 69 on the radially outer side of the adjacent transition portions 26, is a coiled spring structure 70 (FIG. 2). The structure 70 comprising a helical spring 70a and two mounting members 70b which are secured to the apex of the angle members 67 and 69. The spring structure 70 insures a spring biased relation between the two angle members 67 and 69 in a wedging sealing relation with flanges 33 and plates 64. A second spring structure 72 (FIG. 1), similar to structure 70, is secured between the two angle members 67 and 69 on the radially inner side of the transition members 26 to insure a balanced spring biasing force against the angle members on both the radially inner and outer sides of the transition members 26. A single coiled spring member could, however, be used at the center of the transition members (not shown).

It is desirable that the upstream side of the adjacent flanges 33 be slightly tapered, opening in the upstream direction, to accept the apex of the first angle member 67, and, correspondingly, it is desirable that the stop plates 64 be tapered, opening in a downstream direction to accept the apex of the second angle member 69. This insures a better sealing relation between the angles members 67 and 69 and their corresponding radial spaces 62 and 65 and it further allows for expansion between the transition portions 26 with less stress, since there is a lower static coefficient of friction as the angle members move in the spaces 62 and 65.

In operation, the coiled spring structures 70 and 72 hold the angle members 67 and 69 in sealing relation with flanges 33 and stop plates 64, and prevent the high pressure air in the plenum chamber 31 from escaping through the radial openings 62. As the transition portions 26 expand, thereby making the first radial openings 62 smaller, the first angle members 67 are forced in an upstream direction to adjust for the smaller radial openings. As the transition portions 26 and the picture-frame flanges 33 contract, thereby causing the first radial openings 62 to become larger, the coiled spring members 70 and 72 force the first angle members 67 downstream into the larger openings to maintain a proper sealing relation. The function of the second radial openings 65 and the second angle members 69, is to insure that the angle members 67 are aligned longitudinally to maintain proper sealing contact. Because the high pressure compressor air in the plenum chamber 31 is exerting a force against the first angle members 67, it provides the main sealing force between the angle members 67 and the flanges 33 during operation because of the large difference in pressure on the upstream and downstream sides of the flanges.

From the above, it will now be seen that the invention provides for a simple, yet self-adjusting seal structure 70, which permits the expansion and contraction between adjacent transition members 26 while preventing fluid communication between the plenum chamber 31 and the first stage 17. Although the members 67 and 69 are described as V-shaped in cross-section, they may be arcuate in cross-section as long as the members fit in the openings 62 and 65.

What is claimed is:
1. An axial flow gas turbine comprising:
an outer casing,
an inner casing encompassed by said outer casing,
a first stage,
a plenum chamber at least partially defined by said outer casing,
a plurality of combustion chambers disposed within said plenum chamber, and effective to generate hot motive gases to said first stage,
a plurality of first support structures secured to and encompassing said combustion chambers,
each of said support structures being disposed between adjacent chambers,
said first support structures being spaced relative to each other and thereby defining a plurality of first spaces,
a plurality of second support structures secured to and disposed between adjacent combustion chambers,
said second support structures being spaced relative to each other and thereby defining a plurality of second spaces,
a plurality of self-adjusting sealing structures disposed between and effective to close said first and second support structures, and thus prevent leakage of pressurized air between said plenum chamber and said first stage through said first spaces.

2. The arrangement in claim 1 wherein the first spaces extend radially relative to the axis of rotation of the turbine.

3. The arrangement in claim 1 and further including: first sealing means on the radially outer side of said combustion chambers and second sealing means on the radially inner side of said chamber, which when coupled with the self-adjusting sealing structures, prevent fluid communication between the plenum chamber and the first stage.

4. The arrangement in claim 1 wherein the combustion chambers have adjacent transition portions and the seal structures are inserted between said transition portions.

5. The arrangement in claim 1 wherein said first support structures comprise a plurality of flanges secured to and encompassing the combustion chambers and said second support structures comprise a plurality of stop plates secured between the combustion chambers.

6. The arrangement in claim 5 wherein each of the sealing structures comprises a pair of sealing members, spring biased between the flanges and the plates to insure a sealing relation and allow for the expanding or contracting of the first and second spaces.

7. The arrangement in claim 6 wherein the first and second spaces extend radially relative to the axis of rotation of the turbine and the sealing members are radially disposed in the spaces.

8. The arrangement in claim 6 wherein the sealing members comprise angle-shaped members disposed in the first and second spaces.

9. The turbine according to claim 6 wherein the flanges and plates have tapered walls conforming to the shape of the sealing members to form a better sealing relation.

10. The turbine according to claim 1 wherein each of the sealing structures comprises a pair of angle-shaped members disposed in the first and second spaces, and means biasing the members in opposite directions to maintain a sealing relation.

11. The structure according to claim 10 wherein the spaces and angle members inserted therein are radially disposed relative to the axis of rotation of the turbine.

12. In an axial flow gas turbine comprising:
an outer and inner casing,
a first stage,
a plenum chamber at least partially defined by said outer casing,
a plurality of combustion chambers annularly disposed within said plenum chamber and effective to generate hot motive gases to said first stage,
said combustion chambers having arcuate transition portions,
a plurality of flanges secured to and encompassing said transition portions,
said flanges being annularly spaced relative to each other and defining a plurality of first radial spaces,
a plurality of stop plates secured between said transition portions,
said plates being in annular spaced relation and defining a plurality of second radial spaces,
a plurality of angle members radially disposed within said first and second spaces,
said angle members being spring biased between said plates and said flanges to maintain a proper sealing relation.

References Cited

UNITED STATES PATENTS

| | | | |
|---|---|---|---|
| 2,494,821 | 1/1950 | Lombard | 60—39.32 |
| 3,018,624 | 1/1962 | Bonsall et al. | 60—39.31 |
| 3,086,363 | 4/1963 | Fiori | 60—39.37 |
| 3,363,416 | 1/1968 | Heybyrne et al. | 60—39.32 |
| 3,481,146 | 12/1969 | Jackson et al. | 60—39.32 |
| 2,639,579 | 5/1953 | Willgoos | 60—39.66 |

MARK M. NEWMAN, Primary Examiner

W. E. OLSEN, Assistant Examiner

U.S. Cl. X.R.
415—111, 176